A. TUTTON.
LAUNDRY NET CLAMP.
APPLICATION FILED FEB. 26, 1910.
985,714.
Patented Feb. 28, 1911.
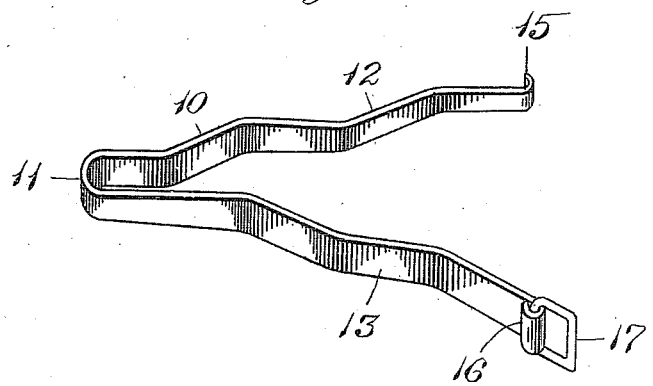
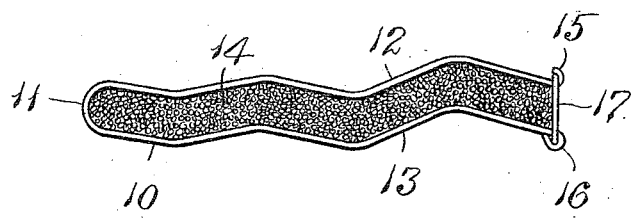

UNITED STATES PATENT OFFICE.

ALFRED TUTTON, OF BOSTON, MASSACHUSETTS.

LAUNDRY-NET CLAMP.

985,714. Specification of Letters Patent. Patented Feb. 28, 1911.

Application filed February 26, 1910. Serial No. 546,112.

*To all whom it may concern:*

Be it known that I, ALFRED TUTTON, of Boston, in the county of Suffolk and State of Massachusetts, have invented certain new and useful Improvements in Laundry-Net Clamps, of which the following is a specification.

The object of the present invention is to provide an improved clamp for closing the mouths of bags or nets such as laundry nets.

The invention is embodied in a strip of resilient metal, such as brass, which strip is bent at a point nearly midway between its ends to form two clamping arms. The general shape of the clamp is like the letter V, but its extremities are curved outwardly and backwardly to form an eye and a hook, the eye being provided to permanently secure a link or loop in hinge relation, which link or loop may be interengaged with the hook at the other extremity to hold the two clamping arms in closed relation. The clamping arms are formed with a plurality of reverse bends, each arm having a zigzag form. The object of forming the arms in this manner is to increase their resilience.

Of the accompanying drawings which illustrate the invention: Figure 1 represents a perspective view of a strip bent to form coactive zigzag clamping arms and provided with a link or loop for connecting its ends. Fig. 2 represents an edge view of the clamp in closed position as applied to a net.

The same reference characters indicate the same parts wherever they occur.

The strip indicated at 10 is preferably flat, or, in other words, rectangular in cross section. Midway between its ends it is bent as indicated at 11 to form two coactive clamping arms 12 and 13, said clamping arms diverging with relation to each other. Each clamping arm is bent first in one direction and then in the other, the bends being very obtuse. The two clamping arms extend in parallelism for a part of their distance from the central bend 11, the parallel portion of the arm 13 being longer than that of the arm 12. In other words, the first zigzag bend of the arm 12 is relatively close to the central bend 11 and the first bend of the arm 13 is farther from the central bend 11. Thus, when the arms are closed upon a net 14, as shown by Fig. 2, the net will be tightly clamped by the first bend in the arm 12. The free end of the arm 12 is bent outwardly and backwardly to form a hook 15, while the free end of the arm 13 is bent outwardly and backwardly and inwardly to form an eye or hinge member 16. A wire loop or link 17 is arranged in the eye 16 in hinged relation with the arm 13. This loop is adapted to be engaged with the hook 15 when the clamping bars are closed to lock the arms in closed position as shown by Fig. 2. The advantage of attaching the loop 17 in the outwardly and backwardly bent portion 16, and providing an outwardly and backwardly bent hook 15, is that the confronting faces of the clamping arms 12 and 13 are entirely smooth and are adapted to be passed over the bag or net without becoming caught.

The clamp may be quickly applied and quickly removed, the only manipulation necessary being pressing together the free ends of the clamping arms and swinging the loop to or from connecting position. The reverse bends in the clamping arms increase the resilience of the arms without depriving the arms of their strength. Comparatively thick or wide sheet metal may be used for the clamping arms in order to afford the requisite strength, the several bends increasing the resilience of the strip. The free ends of the clamping arms are widely separated when the strip is in its normal condition, but at this time the inner ends of the clamping arms are parallel. The parallel relation at the inner ends is not materially changed when the clamp is closed, because when the bag or net is interposed between the arms it becomes tightly wedged between the parallel portions before the free ends of the arms are brought together. There is no appreciable flexure of the central bend 11, and the clamp is adapted to serve indefinitely without being broken at this point.

Having thus described my invention I claim—

A clamp for laundry nets comprising a flat strip of resilient sheet metal formed with a central curved bend and diverging clamping members extending therefrom, the free end of one clamping member being bent outwardly and backwardly to form a hook, the free end of the other member being bent outwardly and backwardly to form an eye, and a wire locking loop pivotally mounted in said eye and adapted to engage said hook, said bars between said curved bend and said free ends being provided with a plurality of angular bends to provide means for relieving the strain on said curved bend, one of said arms being provided with a greater number of said angular bends than the other.

In testimony whereof I have affixed my signature, in presence of two witnesses.

ALFRED TUTTON.

Witnesses:
W. P. ABELL,
P. W. PEZZETTI.

Copies of this patent may be obtained for five cents each, by addressing the "Commissioner of Patents, Washington, D. C."